(12) United States Patent
Tsunekawa et al.

(10) Patent No.: US 9,963,227 B2
(45) Date of Patent: May 8, 2018

(54) VERTICAL TAKE-OFF AND LANDING AIRCRAFT

(71) Applicant: IHI Corporation, Tokyo (JP)

(72) Inventors: Masayoshi Tsunekawa, Tokyo (JP); Tetsuya Tamura, Tokyo (JP)

(73) Assignee: IHI Corporation, Tokyo (JP)

( * ) Notice: Subject to any disclaimer, the term of this patent is extended or adjusted under 35 U.S.C. 154(b) by 16 days.

(21) Appl. No.: 14/384,053

(22) PCT Filed: Mar. 12, 2013

(86) PCT No.: PCT/JP2013/056825
§ 371 (c)(1),
(2) Date: Sep. 9, 2014

(87) PCT Pub. No.: WO2013/137261
PCT Pub. Date: Sep. 19, 2013

(65) Prior Publication Data
US 2015/0053826 A1  Feb. 26, 2015

(30) Foreign Application Priority Data

Mar. 14, 2012  (JP) .................................. 2012-057270

(51) Int. Cl.
*B64C 29/00*  (2006.01)
*B64C 27/20*  (2006.01)
(Continued)

(52) U.S. Cl.
CPC .............. *B64C 29/00* (2013.01); *B64C 27/20* (2013.01); *B64C 27/28* (2013.01);
(Continued)

(58) Field of Classification Search
CPC ..... B64C 29/00; B64C 29/0033; B64C 27/52; B64C 27/02; B64C 31/028; B64C 27/20;
(Continued)

(56) References Cited

U.S. PATENT DOCUMENTS 1,551,834 A   9/1925  Monsen
1,772,049 A * 8/1930  Lake ................... B64C 29/0033
                                                    244/12.4
(Continued)

FOREIGN PATENT DOCUMENTS

DE         2021043      11/1971
GB         2419122 A *  4/2006  ........... B64C 39/026
(Continued)

OTHER PUBLICATIONS

International Search Report, PCT/JP2013/056825, dated Apr. 9, 2013, 2 pgs.
(Continued)

*Primary Examiner* — Medhat Badawi
*Assistant Examiner* — Vicente Rodriguez
(74) *Attorney, Agent, or Firm* — Volpe and Koenig, P.C.

(57) ABSTRACT

There is provided a vertical take-off and landing aircraft including: a propulsion mechanism for generating lift and thrust; a power supply unit (e.g. an engine as a power source) for supplying power to the propulsion mechanism; a main frame for supporting the engine, a seat, and a landing undercarriage; a sub-frame for supporting the propulsion mechanism; a frame coupling unit for rotatably coupling the main frame and the sub-frame; and a control stick connected to the sub-frame, so that an occupant sitting on a seat operates a control stick thereby to move the sub-frame relative to the main frame so as to change the orientation of the propulsion mechanism.

3 Claims, 8 Drawing Sheets

(51) Int. Cl.
　　 *B64D 35/04* (2006.01)
　　 *B64D 31/04* (2006.01)
　　 *B64C 27/28* (2006.01)
　　 *B64C 39/02* (2006.01)

(52) U.S. Cl.
　　 CPC ........ *B64C 29/0033* (2013.01); *B64C 39/026* (2013.01); *B64D 31/04* (2013.01); *B64D 35/04* (2013.01)

(58) Field of Classification Search
　　 CPC ..... B64C 15/12; B64C 25/58; B64C 29/0016; B64D 31/04; B64D 35/04; G05D 1/102
　　 USPC .............................................. 244/23 A, 12.4
　　 See application file for complete search history.

(56) References Cited

U.S. PATENT DOCUMENTS

| | | | | |
|---|---|---|---|---|
| 2,961,189 A * | 11/1960 | Doak | ................ | B64C 29/0033 244/12.4 |
| 2,974,900 A * | 3/1961 | Morris | ................ | B64C 29/0033 244/12.4 |
| 3,035,789 A * | 5/1962 | Young | ................ | B64C 29/0033 244/48 |
| 3,350,035 A * | 10/1967 | Schlieben | ................ | B64C 29/02 244/34 R |
| 4,473,199 A * | 9/1984 | Magill | ................ | B64C 27/06 244/17.11 |
| 4,537,372 A * | 8/1985 | Forizs | ................ | B64C 29/0033 244/12.4 |
| 4,778,128 A * | 10/1988 | Wright | ................ | B64C 39/064 244/23 C |
| 5,058,825 A * | 10/1991 | Rabouyt | ................ | B64C 27/52 244/17.25 |
| 5,779,188 A | 7/1998 | Frick | | |
| 5,839,691 A * | 11/1998 | Lariviere | ............ | B64C 29/0033 244/12.4 |
| 7,644,887 B2 * | 1/2010 | Johnson | ................ | B64C 27/10 244/17.19 |
| 9,045,226 B2 * | 6/2015 | Piasecki | ................ | G05D 1/102 |
| 2002/0003188 A1 | 1/2002 | Moshier | | |
| 2002/0100834 A1 * | 8/2002 | Baldwin | ............... | B64C 11/001 244/12.4 |
| 2002/0113165 A1 | 8/2002 | Moshier | | |
| 2006/0196991 A1 | 9/2006 | Martin | | |
| 2012/0261523 A1 * | 10/2012 | Shaw | ................ | B64C 29/0033 244/7 R |

FOREIGN PATENT DOCUMENTS

| | | |
|---|---|---|
| JP | 59-501202 A | 7/1984 |
| JP | 8-503673 A | 4/1996 |
| JP | 2004-268640 A | 9/2004 |
| JP | 2005-206015 A | 8/2005 |
| JP | 2006-056364 A | 3/2006 |
| JP | 2008-531395 A | 8/2008 |
| JP | 2009-137319 A | 6/2009 |
| JP | 2011-131861 A | 7/2011 |
| WO | 1984/000339 A1 | 2/1984 |

OTHER PUBLICATIONS

Japanese Office Action with English translation, Japanese Patent Application No. 2012-057270, dated Aug. 19, 2015, 8 pgs.
Extended European Search Report, European Patent Application No. 13761380.8, dated Oct. 30, 2015, 7 pgs.

* cited by examiner

VERTICAL TAKE-OFF AND LANDING AIRCRAFT

TECHNICAL FIELD

The present invention relates to a vertical take-off and landing aircraft, and more particularly to a vertical take-off and landing aircraft capable of generating lift without running on the ground.

BACKGROUND ART

A current typical example of vertical take-off and landing aircraft capable of generating lift without running on the ground is a helicopter. A helicopter has a large rotor, compared with its fuselage, and generates lift and thrust by rotating the rotor. There have also been known, though few in number of types, there is a fighter aircraft that perform vertical take-off and landing by changing the direction of the thrust derived from jet engines.

The fuselage of a helicopter has a relatively large size itself, and in addition, the helicopter is equipped with a main rotor larger in size than the fuselage and a tail rotor at the tail of the fuselage. Thus, if take-off, landing or attitude control is performed in a small space surrounded by obstacles such as buildings or trees, the main rotor or the tail rotor may come into contact with the obstacles. Accordingly, a large space needed for the take-off and landing.

A fighter aircraft capable of vertically taking off and landing uses a jet engine which emits a high temperature jet exhaust with a large amount of jet exhaust, and thus people cannot be close to the fighter aircraft when taking off and landing. In addition, small objects such as stones are blown off by the jet exhaust during take-off or landing, possibly damaging surrounding buildings or the like. Thus, also in the case of the fighter aircraft, a large space is needed for the take-off and landing.

In light of this, there has already been proposed a vertical take-off and landing (VTOL) aircraft capable of safe take-off and landing even in a small space (for example, see Patent Documents 1 and 2). The vertical take-off and landing aircraft disclosed in Patent Documents 1 and 2 includes a ducted fans having a propeller type fans arranged within cylindrical ducts or nacelles.

PRIOR ART DOCUMENT

Patent Document

Patent Document 1: Unexamined Japanese Patent Publication No. 2005-206015
Patent Document 2: Unexamined Japanese Patent Publication No. 2006-56364

SUMMARY OF THE INVENTION

Problems to be Solved by the Invention

However, the conventional vertical take-off and landing aircraft equipped with ducted fans require a complicated method for controlling the thrust. For example, it is necessary to additionally provide control vanes or the fans alone need to be tilted by actuators or the like, with the result that the aircraft tend to be priced high.

The present invention was created in view of the above problem, and an object thereof is to provide a vertical take-off and landing aircraft of which thrust can be controlled with simple configuration and which is capable of safe take-off and landing even in a small space surrounded by obstacles.

Means for Solving the Problems

The present invention provides a vertical take-off and landing aircraft comprising: a propulsion mechanism for generating lift and thrust; a power supply unit for supplying power to the propulsion mechanism; a main frame for supporting at least part of the power supply unit, a seat, and a landing undercarriage; a sub-frame for supporting the propulsion mechanism; a frame coupling unit for rotatably coupling the main frame and the sub-frame; and a control stick connected to the sub-frame or the propulsion mechanism, wherein an occupant sitting on the seat operates the control stick thereby to move the sub-frame relative to the main frame so as to change an orientation of the propulsion mechanism.

In addition, the configuration may be such that the propulsion mechanism has a fan for generating lift and thrust, and the power supply unit includes a power source supported by the main frame and a power transmission shaft for transmitting power generated by the power source to the fan, wherein a rotating shaft of the power transmission shaft is disposed coaxially with a rotating shaft of the sub-frame in the frame coupling unit.

Further, the frame coupling unit may include: a main body portion connected to the main frame and having a first cylindrical portion through which the power transmission shaft can be inserted; a rotating portion connected to the sub-frame and having a second cylindrical portion fitted by insertion inside or outside the first cylindrical portion; and a shaft bearing disposed between the first cylindrical portion and the second cylindrical portion.

Furthermore, the vertical take-off and landing aircraft may have a steering assist device including a tension transmission unit connected to the sub-frame, a tension generating unit for applying tension to the tension transmission unit, and an input unit for operating the tension generating unit, so that the steering assist device may assist an operation force of the control stick required to change the orientation of the propulsion mechanism.

Furthermore, the vertical take-off and landing aircraft may have a shock absorber, one end of which is rotatably connected to the main frame and the other one end of which is rotatably connected to the sub-frame, wherein the shock absorber has a lock mechanism capable of fixing a position of a rod, so that the lock mechanism may fix an angle of the propulsion mechanism.

Advantageous Effects of the Invention

According to the above described vertical take-off and landing aircraft of the present invention, the sub-frame having the propulsion mechanism is configured to be swingable back and forth relative to the main frame having the engine, thereby to be able to change the orientation of the propulsion mechanism without moving the engine which is a heavy and important component, to reduce the operation force required for thrust control, and to suppress the variation of the center of gravity during thrust control, thus resulting in stable steering. Consequently, the thrust can be controlled with simple configuration, and take-off and landing can be performed safely even in a small space surrounded by obstacles.

MODE FOR CARRYING OUT THE INVENTION

Figure 1A:
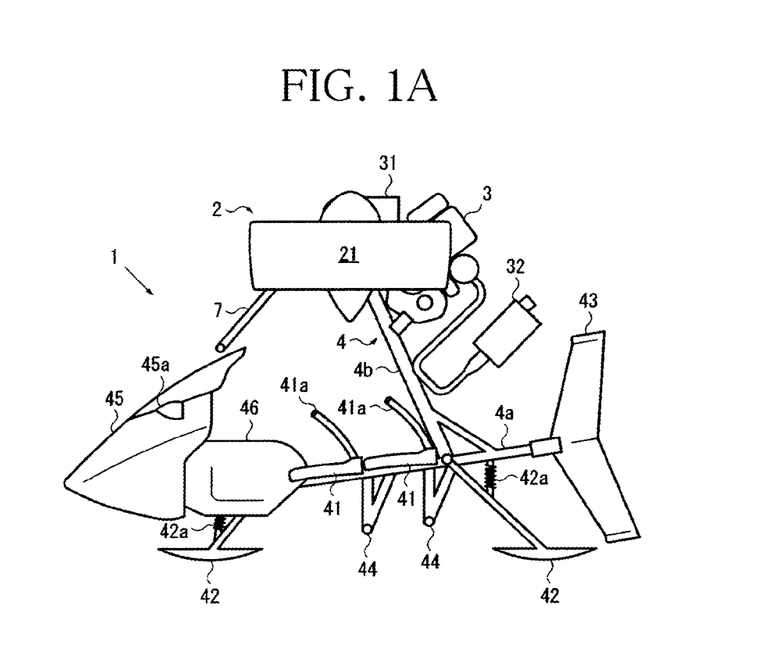
FIG. 1A is a side view illustrating an entire fuselage of a vertical take-off and landing aircraft according to a first embodiment of the present invention.
Figure 1B:
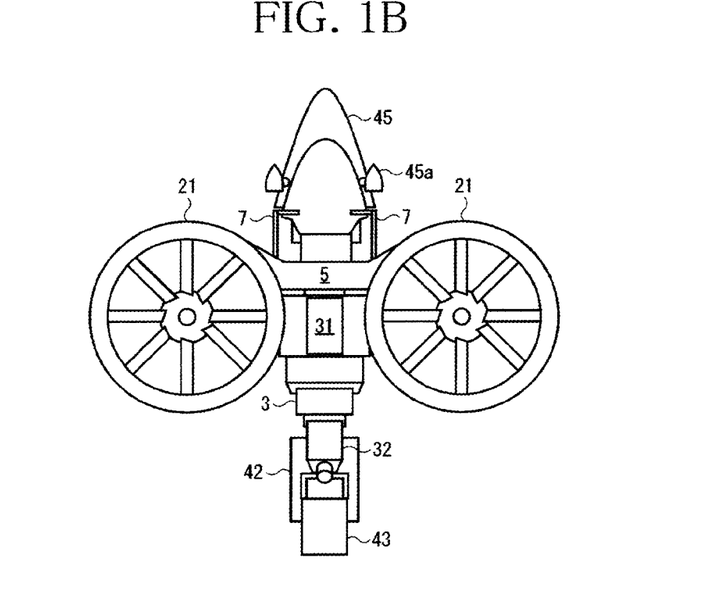
FIG. 1B is a top view illustrating the entire fuselage of the vertical take-off and landing aircraft according to the first embodiment of the present invention.
Figure 2:
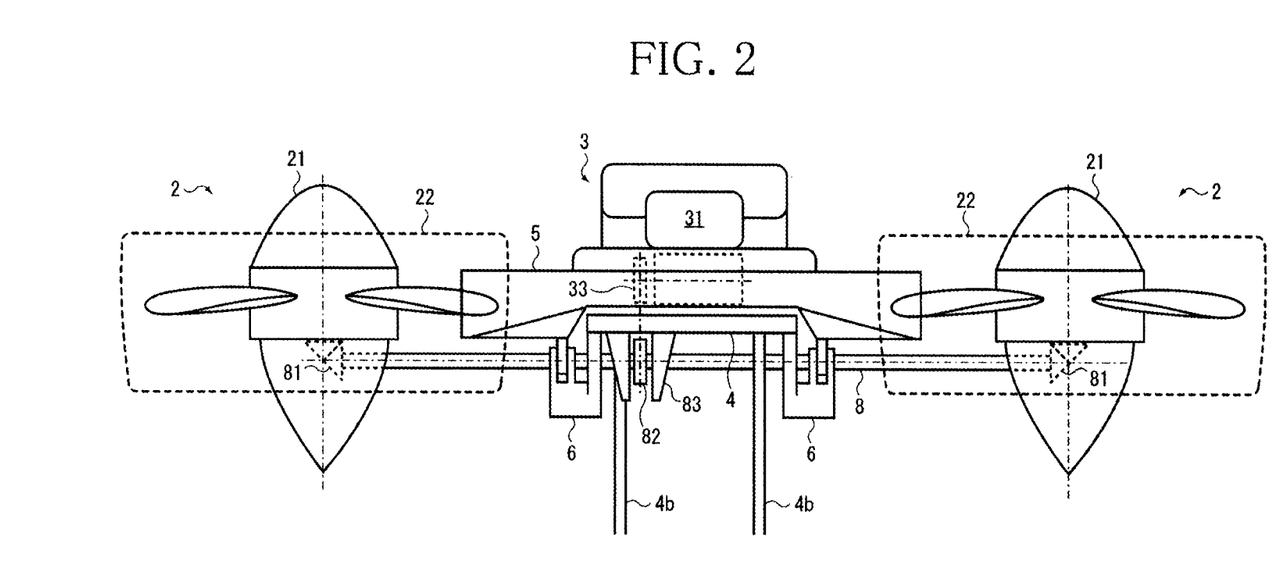
FIG. 2 is a schematic configuration view illustrating a drive system of the vertical take-off and landing aircraft illustrated in FIGS. 1A and 1B.
Figure 3A:
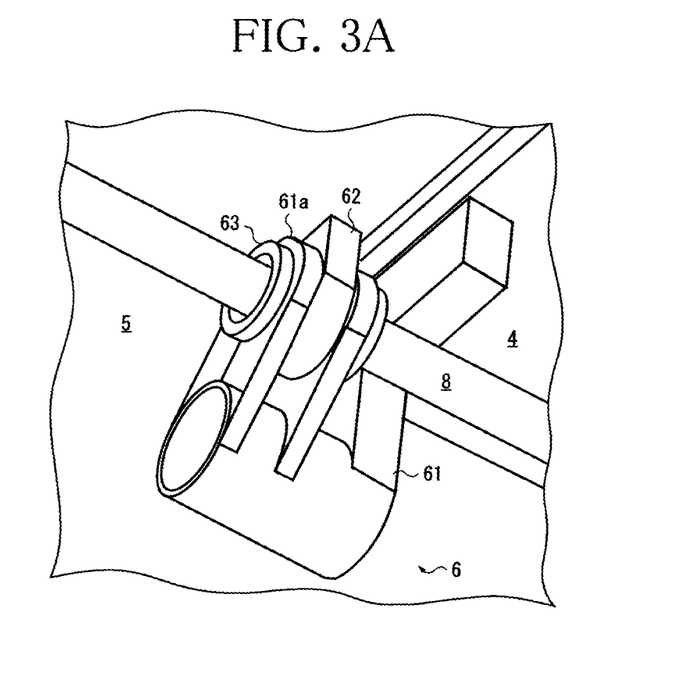
FIG. 3A is an external view illustrating a frame coupling unit illustrated in FIG. 2.
Figure 3B:
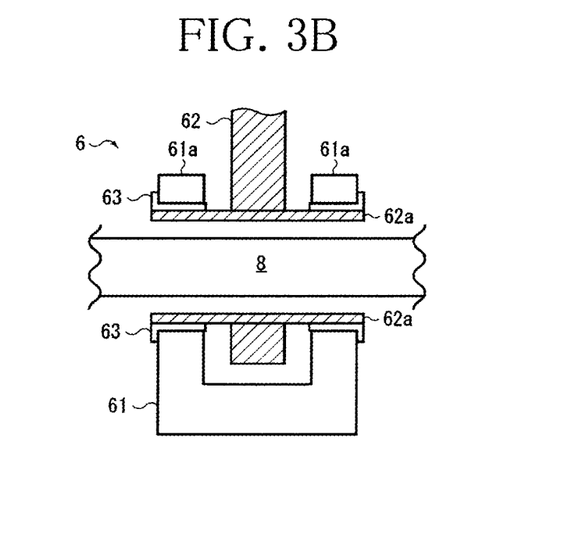
FIG. 3B is a sectional view illustrating the frame coupling unit illustrated in FIG. 2.
Figure 3C:
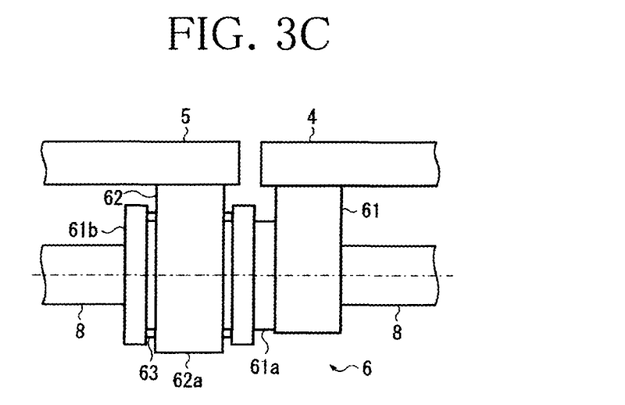
FIG. 3C is a view illustrating a modification of the frame coupling unit illustrated in FIG. 2.

Hereinafter, embodiments of the present invention will be described with reference to the accompanying drawings. As illustrated herein, FIGS. 1A and 1B each are a view illustrating a vertical take-off and landing aircraft according to a first embodiment of the present invention. FIG. 1A is a side view illustrating an entire fuselage thereof, and FIG. 1B is a top view illustrating the entire fuselage thereof. FIG. 2 is a schematic configuration view illustrating a drive system of the vertical take-off and landing aircraft illustrated in FIGS. 1A and 1B. FIGS. 3A to 3C each are a view illustrating a frame coupling unit illustrated in FIG. 2. FIG. 3A is an external view thereof, FIG. 3B is a sectional view thereof, and FIG. 3C is a view illustrating a modification thereof.

As illustrated in the figures, the vertical take-off and landing aircraft 1 according to the first embodiment of the present invention includes: a propulsion mechanism 2 which generates lift and thrust; a power supply unit (such as an engine 3 as a power source) which supplies power to the propulsion mechanism 2; a main frame 4 which supports the engine 3, a seat, and a landing undercarriage; a sub-frame 5 which supports the propulsion mechanism 2; a frame coupling unit 6 which rotatably couples the main frame 4 and the sub-frame 5; and control sticks 7 which is connected to the sub-frame 5, so that an occupant sitting on a seat 41 operates the control sticks 7 thereby to move the sub-frame 5 relative to the main frame 4 so as to change the orientation of the propulsion mechanism 2.

The propulsion mechanism 2 includes two fans 21 disposed one on the both sides of the engine 3; and a substantially cylindrical nacelle 22 covering each of the fans 21, all of which are supported by the sub-frame 5. More specifically, the propulsion mechanism 2 includes a pair of fans 21, one disposed on the left side of the fuselage and the other disposed on the right side thereof. The pair of fans 21 is integrally connected to each other by the sub-frame 5. Note that the present embodiment illustrates a ducted fan as the propulsion mechanism 2, but the propulsion mechanism 2 is not limited to this configuration and may be a propeller, an ejector, or the like.

The engine 3 is a power source which supplies power to the fans 21 through the drive system illustrated in FIG. 2. For example, the engine 3 includes an electric motor, a reciprocating engine, and the like, and may also include a supercharger. The engine 3 is fixed to a rear surface of the main frame 4. The engine 3 receives fuel supplied from a fuel tank 31 disposed on an upper portion of the fuselage and burns the fuel to output power. Then, the engine 3 discharges exhaust gas through an exhaust nozzle 32 disposed rearward.

As illustrated in FIG. 2, the drive system (power transmission mechanism) of the vertical take-off and landing aircraft 1 includes: an engine 3; a sprocket 33 connected to the end of an output shaft of the engine 3; a power transmission shaft 8 having bevel gears 81, one on each end thereof, and having a sprocket 82 in a middle portion thereof; a roller chain stretched across the sprockets 33 and 82; and a shaft bearing 83 which rotatably supports the power transmission shaft 8, wherein the power outputted from the engine 3 is transmitted to the power transmission shaft 8 through a chain drive mechanism and the rotation of the power transmission shaft 8 is transmitted to a drive shaft of the fan 21 through the bevel gear 81. Note that FIG. 2 is a front view of an upper portion of the vertical take-off and landing aircraft 1.

The power transmission between the engine 3 and the power transmission shaft 8 is not limited to the chain drive mechanism, but may be a belt drive mechanism or a gear drive mechanism, or a deceleration mechanism or an acceleration mechanism may be interposed therebetween. If it is desired to control the rotation speed of each fan 21 individually, the engine 3 may be connected to each fan 21 individually. The shaft bearing 83 which supports the power transmission shaft 8 is disposed on the main frame 4 to which the engine 3 is fixed and is configured to keep the positional relationship between the output shaft of the engine 3 and the power transmission shaft 8.

Note that the propulsion mechanism 2, the power source (engine 3), and the power transmission mechanism described above are not limited to the illustrated configuration, but for example, the power source may be a jet engine such as a turboprop engine and a turboshaft engine, or other engine (such as a turbojet engine and a turbofan engine) with a power source incorporated into the propulsion mechanism 2. When a power source is incorporated into the propulsion mechanism 2, the main frame 4 includes a heavy component such as a fuel tank constituting part of the power supply unit and a component to be protected from swinging.

The main frame 4 is a component which supports the engine 3, the seats 41, and the landing undercarriage 42. For example, the main frame 4 includes a base frame 4a extending forward and rearward and a pillar frame 4b extending forward obliquely upward from the base frame 4a. The base frame 4a and the pillar frame 4b each have a symmetrical paired structure. More specifically, each of a pair of base frames 4a and pillar frames 4b is connected by a coupling frame to form an integrated frame structure.

The base frame 4a includes seats 41 (including a front seat and a rear seat) on which each occupant sits; a plurality of the landing undercarriage 42 forming a leg portion for use in grounding on the ground surface or the like when landing; a tail 43 for stabilizing moment and balance of the fuselage; and footrests 44 for supporting the feet of each occupant. The seat 41 may include a seat belt 41a and the landing undercarriage 42 may include a damper 42a. In addition, a cowl 45 as a rectifying unit is connected in front of the seat 41. Part of the cowl 45 is made of a transparent member to secure the view and a rearview mirror 45a is disposed on a side surface portion. Note that a connection portion 46 between the seats 41 and the cowl 45 may be used as a console box or as a control unit in which an operation switch and an operation lever of the engine 3 are disposed. Note also that the rearview mirror 45a is disposed in an optimum position to secure rearward visibility and the position thereof is not limited to the left and right side surface portions of the cowl 45.

The main body of the engine 3 is fixed to a rear surface of the pillar frame 4b and the fuel tank 31 is fixed to an upper portion (roof portion) of the pillar frame 4b. Note that a plate member against rain may be disposed on the roof portion of the pillar frame 4b.

The sub-frame 5 is a component for connecting the left and right fans 21 to each other. The control sticks 7 extending forward of the seats 41 are connected to the sub-frame 5. The control sticks 7 are provided to rotate the sub-frame 5 and the propulsion mechanism 2 and thus the control sticks 7 may be connected to an outer peripheral surface of the propulsion mechanism 2. Thus, as illustrated in FIG. 2, the sub-frame 5 is rotatably connected to the main frame 4 through the frame coupling unit 6.

Such a frame structure allows all of the seats 41 and the engine 3 to be fixed to the main frame 4 to form an integral structure so as to prevent relative movement. Meanwhile, the propulsion mechanism 2 (fan 21) is fixed to the sub-frame 5. Thus, the sub-frame 5 is rotatably connected to the main frame 4 thereby to move (rotate) the propulsion mechanism 2 (fan 21) relative to the seats 41 and the engine 3.

As illustrated in FIG. 2, the vertical take-off and landing aircraft 1 includes the fans 21 which is used for the propulsion mechanism 2 to generate lift and thrust; and the power supply unit includes the power source (engine 3) supported by the main frame 4 and a power transmission shaft 8 which transmits power generated by the engine 3 to the fans 21, wherein the rotating shaft of the power transmission shaft 8 is disposed coaxially with the rotating shaft of the sub-frame 5 in the frame coupling unit 6. Such a configuration allows the fans 21 to be rotated along the rotating shaft of the power transmission shaft 8 while maintaining the connection state in the coupling unit (bevel gear 81) between the power transmission shaft 8 and the fans 21, so as to change the orientation of the propulsion mechanism 2.

For example, as illustrated in FIGS. 3A and 3B, the frame coupling unit 6 includes: a main body portion 61 connected to a lower surface of the main frame 4 and having a first cylindrical portion 61a through which the power transmission shaft 8 can be inserted; a rotating portion 62 connected to a lower surface of the sub-frame 5 and having a second cylindrical portion 62a fitted by insertion inside the first cylindrical portion 61a; and a shaft bearing 63 disposed between the first cylindrical portion 61a and the second cylindrical portion 62a. The main body portion 61 extends in a substantially L-shape from the main frame 4 and a pair of first cylindrical portions 61a extend from the distal end portion thereof. The rotating portion 62 is disposed between the pair of first cylindrical portions 61a, and thus the first cylindrical portion 61a serves as a stopper of the rotating portion 62. Note that the distal end portion of the main body portion 61 may be formed in a hollowed cylindrical shape for reducing weight.

Note that as illustrated by a modification in FIG. 3C, the frame coupling unit 6 may be configured such that the main body portion 61 is made of a flange portion connected to the lower surface of the main frame 4. In such a modification, the first cylindrical portion 61a is fitted by insertion in the flange portion forming the main body portion 61 and the power transmission shaft 8 is inserted thereinside in a contactless state. In addition, the rotating portion 62 is substantially is configured with the second cylindrical portion 62a and is fitted by insertion outside the first cylindrical portion 61a. Note that annular stoppers 61b fitted by insertion or formed in the first cylindrical portion 61a may be disposed one on both sides of the second cylindrical portion 62a.

Figure 4A:
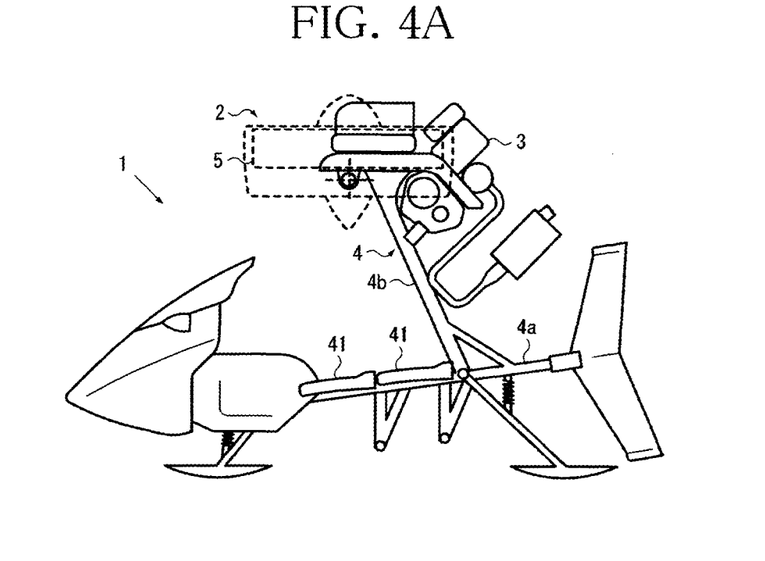
FIG. 4A is a view illustrating a horizontal state.
Figure 4B:
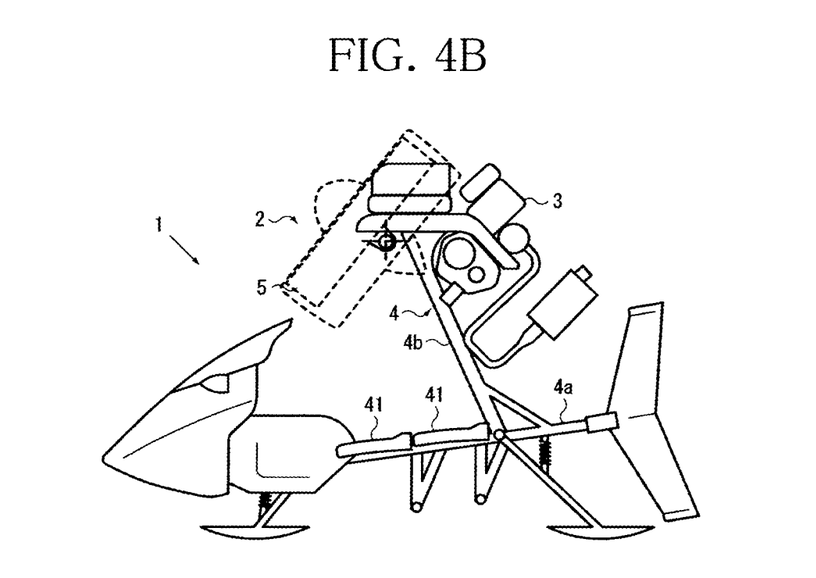
FIG. 4B is a view illustrating a forth tilt state into which the sub-frame is swung.
Figure 4C:
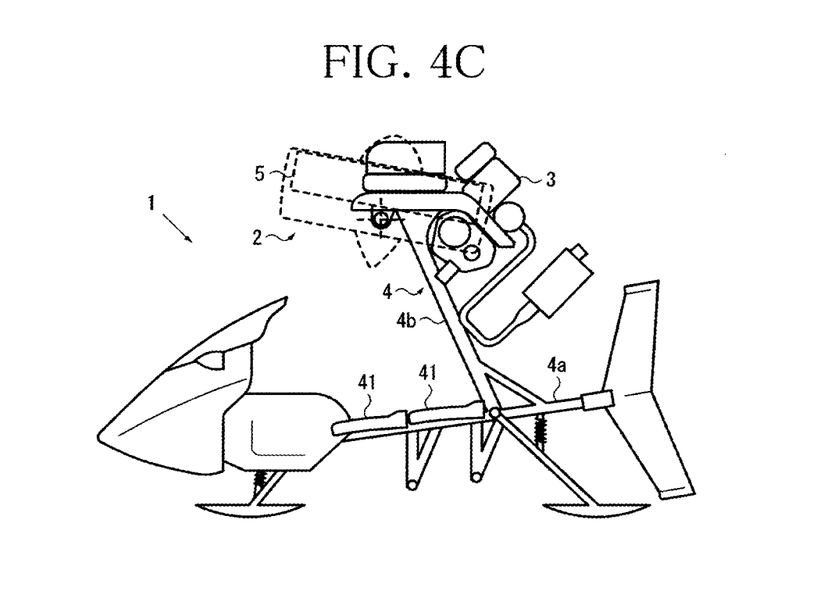
FIG. 4C is a view illustrating a back tilt state into which the sub-frame is swung.
Figure 5A:
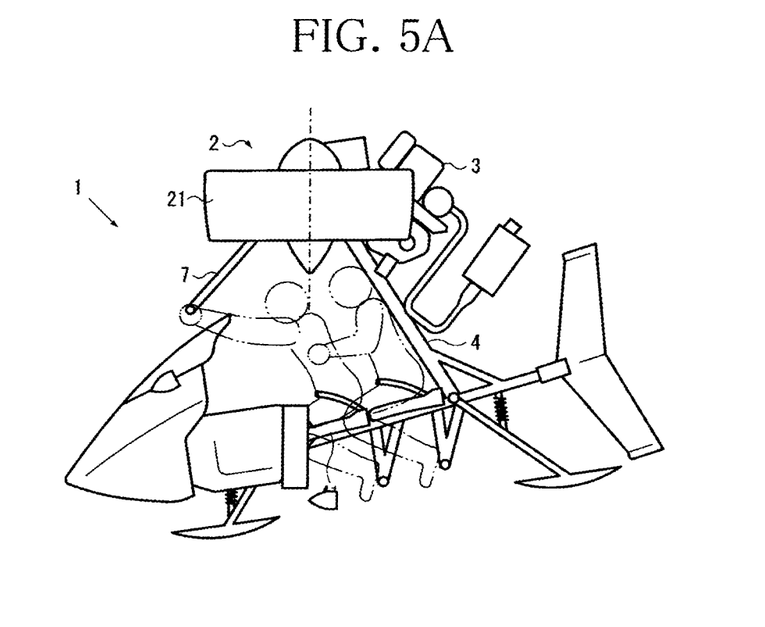
FIG. 5A is a view illustrating a hovering flight condition of the vertical take-off and landing aircraft illustrated in FIGS. 1A and 1B.
Figure 5B:
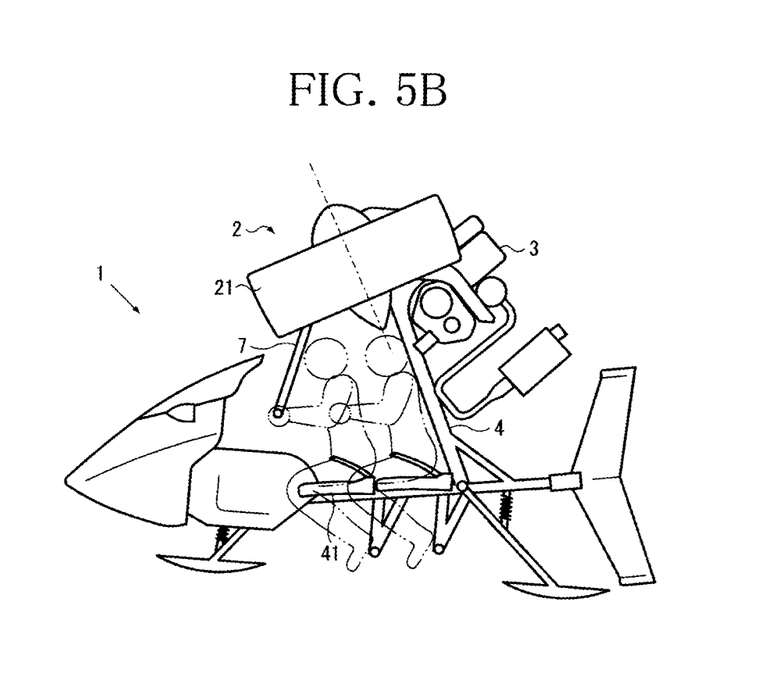
FIG. 5B is a view illustrating a forward flight condition of the vertical take-off and landing aircraft illustrated in FIGS. 1A and 1B.

As illustrated herein, FIGS. 4A to 4C each are a view illustrating a state into which the sub-frame is swung: with FIG. 4A illustrating a horizontal state, FIG. 4B illustrating a forth tilt state, and FIG. 4C illustrating a back tilt state respectively. FIGS. 5A and 5B each are a view illustrating a flight condition of the vertical take-off and landing aircraft illustrated in FIGS. 1A and 1B, with FIG. 5A illustrating a hovering flight condition and FIG. 5B illustrating a forward flight condition. Note that for convenience of description, the control sticks 7 are omitted in FIGS. 4A to 4C.

As described above, the vertical take-off and landing aircraft 1 according to the present embodiment divides the frame forming the fuselage into the main frame 4 and the sub-frame 5, connects the sub-frame 5 to the main frame 4 in a rotatable manner, and disposes the propulsion mechanism 2 on the sub-frame 5, whereby only the propulsion mechanism 2 can be rotated. Therefore, the vertical take-off and landing aircraft 1 can change the orientation of the propulsion mechanism 2 without moving the engine 3 and the fuel tank 31 which are heavy and important components, can reduce the operation force required for thrust control, and can suppress the variation of the center of gravity during thrust control, resulting in stable steering.

For example, the control sticks 7 are pulled downward from a state in which the propulsion mechanism 2 is maintained substantially horizontal as illustrated in FIG. 4A, whereby the sub-frame 5 can be rotated downward, and thus the propulsion mechanism 2 can be easily changed into a forward tilt state as illustrated in FIG. 4B. Alternatively, the control sticks 7 are pulled upward from the state in which the propulsion mechanism 2 is maintained substantially horizontal as illustrated in FIG. 4A, whereby the sub-frame 5 can be rotated upward, and thus the propulsion mechanism 2 can be easily changed into a back tilt state as illustrated in FIG. 4C.

There follows a description of flight conditions (hovering flight condition and forward flight condition) of the vertical take-off and landing aircraft 1. In FIGS. 4A and 4B, an occupant P sits on each seat 41 and the occupant P sitting on the front seat operates the aircraft.

As illustrated in FIG. 4A, during hovering flight, the aircraft operator operates the control sticks 7 so that the drive shaft of the propulsion mechanism 2 (fan 21) is oriented in a substantially vertical direction. With such an operation, the thrust generated by the propulsion mechanism 2 only results in the generation of lift on the fuselage while the occurrence of forward (or backward) thrust on the fuselage is prevented. During hovering flight, the output of the engine 3 is adjusted so that the lift of the propulsion mechanism 2 substantially matches the weight of the fuselage. The hovering refers to a state in which the vertical take-off and landing aircraft 1 is stopped in the air, but when ascending or descending for taking off or landing in a vertical direction, the aircraft is placed in substantially the same position as during hovering. More specifically, when taking off, the output of the engine 3 may be adjusted so that the lift of the propulsion mechanism 2 is greater than the weight of the fuselage; and when landing, the output of the engine 3 may be adjusted so that the lift of the propulsion mechanism 2 is less than the weight of the fuselage.

During forward flight as illustrated in FIG. 4B, the aircraft operator pulls the control sticks 7 toward the operator so as to rotate the sub-frame 5, namely, the propulsion mechanism 2 (fan 21) forward. Such an operation allows the propulsion mechanism 2 (fan 21) to jet the air obliquely rearward, whereby the fuselage can be moved forward by the front-rear direction component of the thrust of the propulsion mechanism 2. In order to move straight forward, the output of the engine 3 may be adjusted so that the vertical component (lift) of the thrust of the propulsion mechanism 2 substantially matches the weight of the fuselage.

Although not illustrated, when turning right, the body weight may be moved to the right side as viewed from the aircraft operator thereby to tilt the fuselage to the right side so as to generate thrust toward the left side of the fuselage; and when turning left, the body weight may be moved to the left side as viewed from the aircraft operator thereby to tilt the fuselage to the left side so as to generate thrust toward the right side of the fuselage.

Note that the above embodiment has described the vertical take-off and landing aircraft 1 having a two-seater seat 41, but the rear seat may be used as a luggage seat for placing goods or materials or the rear seat may be omitted. If the rear seat is omitted, the vertical take-off and landing aircraft 1 has a single-seater seat, and thus the position of the seat 41 needs to be adjusted by considering the weight balance and the like.

Now, the description will focus on a vertical take-off and landing aircraft 1 according to other embodiments of the present invention. As illustrated herein, FIGS. 6A and 6B each are a view illustrating a vertical take-off and landing aircraft according to a second embodiment of the present invention, with FIG. 6A being a side view and FIG. 6B illustrating a modification. FIGS. 7A to 7C each are a view illustrating a vertical take-off and landing aircraft according to a third embodiment of the present invention, with FIG. 7A being a bottom view of a ceiling portion of the aircraft body, FIG. 7B being a sectional view along line X-X in the hovering flight condition, and FIG. 7C being a sectional view along line X-X in the forward flight condition.

Figure 6A:
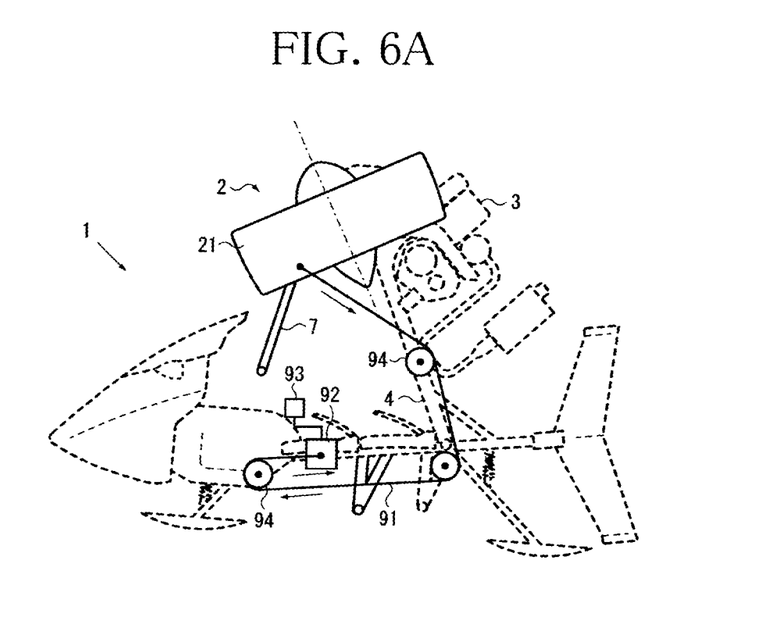
FIG. 6A is a side view illustrating a vertical take-off and landing aircraft according to a second embodiment of the present invention.
Figure 6B:
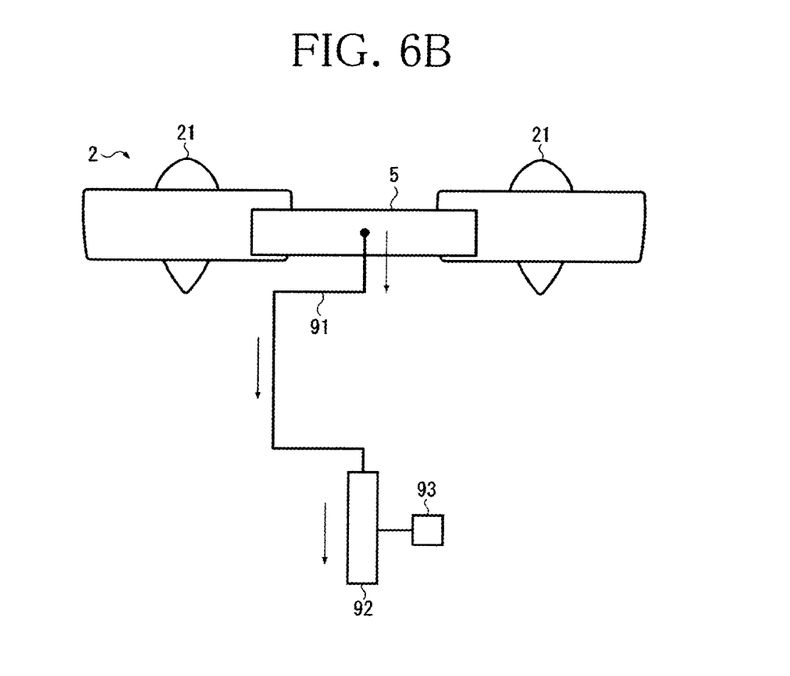
FIG. 6B is a view illustrating a modification of the vertical take-off and landing aircraft according to the second embodiment of the present invention.
Figure 7A:
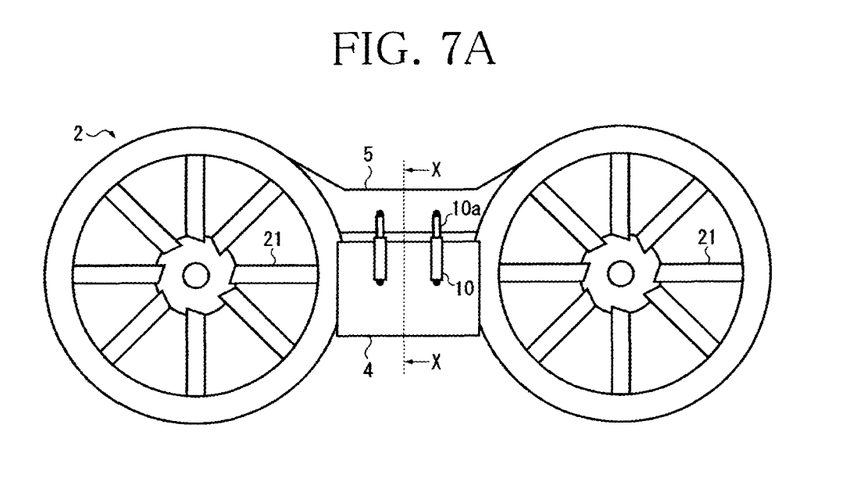
FIG. 7A is a bottom view illustrating a ceiling portion of a fuselage of a vertical take-off and landing aircraft according to a third embodiment of the present invention.
Figure 7B:
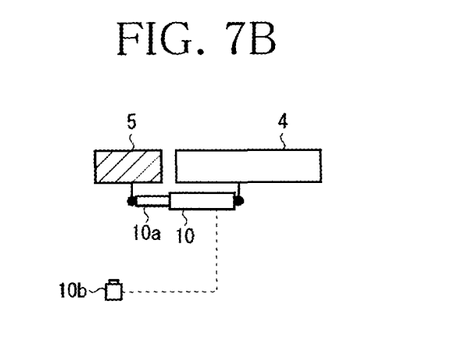
FIG. 7B is a sectional view along line X-X of the vertical take-off and landing aircraft in the hovering flight condition according to the third embodiment of the present invention.
Figure 7C:
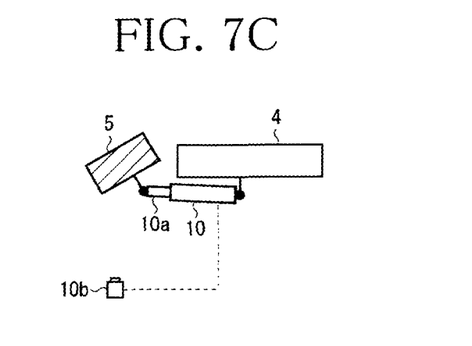
FIG. 7C is a sectional view along line X-X of the vertical take-off and landing aircraft in the forward flight condition according to the third embodiment of the present invention.

The vertical take-off and landing aircraft of the second embodiment illustrated in FIGS. 6A and 6B has a steering assist device 9 including a tension transmission unit 91 connected to the sub-frame 5, a tension generating unit 92 for applying tension to the tension transmission unit 91, and an input unit 93 for operating the tension generating unit 92, so that the steering assist device 9 assists an operation force of the control sticks 7 required to change the orientation of the propulsion mechanism 2.

The arrangement of such a steering assist device 9 allows the steering assist device 9 to compensate for part of the operation force required to operate the control sticks 7, and to reduce a force required to operate the control sticks 7, thus improving operability.

More specifically, for example, the tension transmission unit 91 is made of a string member such as a wire, with one end thereof being connected to the sub-frame 5 and the other end thereof being connected to the tension generating unit 92 as illustrated in FIG. 6A. In addition, the tension transmission unit 91 is disposed along the main frame 4 to avoid interference with the occupant, and is wrapped around a plurality of pulleys 94. Note that the tension transmission unit 91 may have an outer tube into which the string member such as a wire is inserted.

The tension generating unit 92 may be any one as long as it can move the tension transmission unit 91 at least in one direction, and it may be, for example a jack, an air cylinder, a hydraulic cylinder, an electric cylinder, or the like. The input unit 93 is an unit for operating the tension generating unit 92, and it may be, for example a pedal, a rotating handle, a hand lever, a foot lever, a power switch, or the like.

The modification illustrated in FIG. 6B extends the tension transmission unit 91 directly under the sub-frame 5 without bypassing the tension transmission unit 91 and is connected to the tension generating unit 92 by partially offset to avoid interference with the occupant. Such a modification can reduce the length of the tension transmission unit 91, can suppress an increase in weight, and can improve responsiveness.

The vertical take-off and landing aircraft of the third embodiment illustrated in FIGS. 7A to 7C has a shock absorber 10 with one end being rotatably connected to the main frame 4 and the other end being rotatably connected to the sub-frame 5, and the shock absorber 10 has a lock mechanism (unillustrated) which can fix the position of the rod 10a, so that the lock mechanism fixes the angle of the propulsion mechanism 2.

Such a shock absorber 10 is disposed between the main frame 4 and the sub-frame 5, whereby vibrations occurring from the engine 3 and the fan 21 can be dampened and the entire vibrations of the fuselage can be suppressed. In addition, the shock absorber 10 having the lock mechanism can be used to lock the state in which the sub-frame 5 is rotated relative to the main frame 4, which can eliminate the need for the occupant to maintain a constant state by operating the control sticks 7, and thus can improve operability and reduce fatigue of the occupant.

Specifically, the shock absorber 10 is made of a gas spring or a hydraulic cylinder which are commercially available. A valve capable of stopping a flow of gas and liquid is disposed inside the shock absorber 10. When the valve is opened, the rod 10a can be extended and retracted. When the valve is closed, the movement of the rod 10a can be stopped. Note that the shock absorber 10 is connected to the main frame 4 and the sub-frame 5, for example, by a universal joint.

A switch 10b for opening and closing the valve is disposed, for example, in the connection portion 46 of the fuselage or the control sticks 7, and is configured to close the valve in a state in which the switch 10b is pressed. Thus, if fixing the angle of the propulsion mechanism 2 (fan 21) is desired, the switch 10b may be pressed, and if changing the angle of the propulsion mechanism 2 (fan 21) is desired, the switch 10b may not be pressed. Note that the switch 10b may be configured to open the valve in a state in which the switch 10b is pressed.

The present invention is not limited to the foregoing embodiments and may of course be modified in various ways without departing from the scope of the invention.

EXPLANATION OF REFERENCE SIGNS 1 vertical take-off and landing aircraft
2 propulsion mechanism
3 engine
4 main frame
5 sub-frame
6 frame coupling unit
7 control stick
8 power transmission shaft
9 steering assist device
10 shock absorber
10a rod
21 fan
41 seat
42 landing undercarriage
61 main body portion
61a first cylindrical portion
62 rotating portion
62a second cylindrical portion
63 shaft bearing
91 tension transmission unit
92 tension generating unit
93 input unit

The invention claimed is:

1. A vertical take-off and landing aircraft comprising:
a pair of fans or propellers that generate lift and thrust;
a power supply unit that supplies power to the fans or propellers, wherein the power supply unit includes a power source and a power transmission shaft for transmitting power generated by the power source to the fans or propellers;
a main frame connected to the power supply unit that supports the power source and at least part of a seat, and a landing undercarriage;
a single sub-frame to which the pair of fans or propellers is fixed;
a frame coupling unit for rotatably coupling the main frame and the single sub-frame, wherein the single sub-frame rotates around a rotating shaft of the power transmission shaft in the frame coupling unit; and
a control stick attached directly to the single sub-frame, wherein
an occupant sitting on the seat operates the control stick thereby to move the single sub-frame relative to the main frame so as to change an orientation of the pair of fans or propellers;
wherein the frame coupling unit comprises:
a main body portion connected to the main frame and having a pair of first cylindrical portions through which the power transmission shaft is inserted,
a rotating portion connected to the single sub-frame and having a second cylindrical portion fitted by insertion inside or outside the pair of first cylindrical portions, and
a shaft bearing disposed between the pair of first cylindrical portions and the second cylindrical portion; and
wherein the main body portion extends in a substantially L-shape from a lower surface of the main frame, the pair of first cylindrical portions extends from a distal end portion thereof and the rotating portion is disposed between the pair of first cylindrical portions.

2. The vertical take-off and landing aircraft according to claim 1, comprising a steering assist device including: a tension transmission unit connected to the single sub-frame, a tension generating unit for applying tension to the tension transmission unit, and an input unit for operating the tension generating unit, so that the steering assist device assists an operation force of the control stick required to change the orientation of the fans or propellers.

3. The vertical take-off and landing aircraft according to claim 1, further comprising a shock absorber rotatably connected to the main frame and rotatably connected to the single sub-frame that dampens vibrations from the single sub-frame from being transferred to the main frame, wherein the shock absorber includes a lock mechanism capable of fixing a position of a rod, so that the lock mechanism fixes an angle of the fans or propellers.

* * * * *